United States Patent [19]

Wallner et al.

[11] 4,279,517
[45] Jul. 21, 1981

[54] MIXING APPARATUS FOR CHEMICALLY REACTING FLUID COMPONENTS, PARTICULARLY POLYURETHANE-FORMING COMPONENTS

[75] Inventors: Josef Wallner, Holzkirchen; Lothar Metzinger, Osnabrück, both of Fed. Rep. of Germany

[73] Assignee: Elastogran Maschinenbau GmbH & Co., Munich, Fed. Rep. of Germany

[21] Appl. No.: 67,449

[22] Filed: Aug. 20, 1979

[30] Foreign Application Priority Data

Sep. 6, 1978 [DE] Fed. Rep. of Germany ....... 2838798

[51] Int. Cl.³ .......................... B01F 5/04; B29D 27/02
[52] U.S. Cl. ...................................... 366/177; 184/18;
366/269; 366/341; 425/107
[58] Field of Search ............... 366/150, 177, 267, 268,
366/269, 341; 425/4 R, 817 R, 107; 422/133;
137/246.12; 417/498; 184/18

[56] References Cited

U.S. PATENT DOCUMENTS

| 1,981,551 | 11/1934 | Hermann | 184/18 X |
|---|---|---|---|
| 2,085,976 | 7/1937 | Heintz | 184/18 X |
| 2,166,857 | 7/1939 | Bugatti | 184/18 X |
| 2,228,531 | 1/1941 | Newman | 425/107 |
| 4,108,606 | 8/1978 | Wingard | 422/133 X |

Primary Examiner—Philip R. Coe
Attorney, Agent, or Firm—H. Dale Palmatier

[57] ABSTRACT

A mixing apparatus for mixing components that interact chemically, preferably polyurethane-forming components, the apparatus including a control plunger disposed within a housing and movable along a mixing chamber between opposing inlet and return ports, the control plunger having along its wall surface return grooves for connecting the inlet ports to the return ports when the plunger is in a position blocking communication between the inlet ports and the mixing chamber wherein a wall surface portion of the control plunger which in the closing position of the plunger is disposed intermediate the return ports is provided with discrete recesses which mutually overlap in the direction of movement of the control plunger.

8 Claims, 4 Drawing Figures

MIXING APPARATUS FOR CHEMICALLY REACTING FLUID COMPONENTS, PARTICULARLY POLYURETHANE-FORMING COMPONENTS

The present invention relates generally to mixing apparatus and particularly to a mixing apparatus for chemically reacting fluid components, preferably polyurethane-forming components. Apparatus of this type generally include a housing in which is arranged a mixing chamber with inlet ports for admitting the individual components and an outlet port for discharging a mixture of the components supplied, a control plunger being arranged within this mixing chamber whereby the cross-section of this control plunger substantially corresponds to the cross-section of the mixing chamber. The control plunger is adapted to be reciprocated from a position in which the plunger clears the inlet ports into a position in the vicinity of the outlet port whereby in the latter position the plunger blocks communication between the inlet ports and the mixing chamber. The control plunger is provided with return grooves for connecting the inlet ports to return conduits in the housing in synchronism with the blocking of communication between the inlet ports and the mixing chamber.

In a heretofore known mixing apparatus of the above type are provided, between the return grooves, longitudinal grooves into which may enter the mixture of components, and the components of this mixture may, under circumstances, react within these longitudinal grooves. These longitudinal grooves and the optionally curing component mixture serve as seals between the return grooves. An apparatus of this type is disclosed e.g. in the German Pat. No. 2,117,533.

In mixing apparatus of the type stated above, the control plunger and the housing defining the mixing chamber are made of steel. The plunger will be moved at high velocity and a high oscillating frequency. The pressures within the conduits for the components are quite high and not always entirely balanced. The clearance between plunger and cylinder must be made as small as possible, in order to avoid an overflow from the area of the one component into the area of another component. Due to this narrow clearance there may occur seizing between control plunger and cylinder, i.e. the wall of the mixing chamber. When seizing occurs which may result in complete jamming, the overall apparatus will become unserviceable.

It is an object of the present invention to provide a novel and improved mixing apparatus of the type set forth at the outset of the present specification in which apparatus seizing of the control plunger is effectively prevented.

This object is achieved in accordance with the present invention by the fact that a wall surface portion of the control plunger which is disposed intermediate the return grooves is provided with separate recesses that mutually overlap in the direction of movement of the control plunger.

The recesses which may preferably have the configuration of slots or of blind bores very efficiently counteract a possible seizing. This will become apparent by the following considerations:

(1) The metallic surfaces that are in mutual sliding contact are reduced.

(2) The frictional surface of the control plunger is interrupted by these recesses, in thereby counteracting the tendency of seizing. If seizing should nevertheless occur, this will immediately be interrupted by shearing or rubbing off of the seizing material traces by the mutually overlapping recesses.

(3) Component mixture may enter into the recesses, and this component mixture may be effective as a lubricant. When the component mixture reacts, the reaction product likewise exhibits a certain lubricating or sliding agent effect since a non-metallic material, i.e. the reaction mixture, slides along the metallic cylinder surface.

(4) When components react within the recesses, the "anchoring" of the reaction product is very good since there are available surfaces extending perpendicularly of the direction of movement of the control plunger which retain the reaction product. The surfaces to which the reaction product adheres within the recesses is relatively large so that the adhesive effect ensures a good fitting.

(5) Particularly when the recesses are defined as slots or pockets extending transversely of the direction of movement of the control plunger and at least into the vicinity of the return grooves, there will be enhanced the formation of a reaction product since the components will enter the individual slots at a mixture ratio ensuring a well-defined reaction product in the sense of a corresponding formulation.

(6) Optionally, the web between the recesses in the control plunger act as agitating elements with respect to the component material disposed within the recesses or respectively pockets.

In accordance with the present invention it is likewise possible to extend the recesses in the longitudinal direction of the control plunger into the region of the hydraulic control means which reciprocates the control plunger up and down within the mixing chamber, in thereby enhancing the sealing effect in this region. By this effect will effectively be prevented that hydraulic fluid may penetrate into the mixing chamber.

When the slots or pockets are alternately connected to the mutually opposing return grooves, there will alternately be allowed a direct entry of components, and since the slots are closely adjacent and overlap each other, there may be ensured the mixing strictly in line with the mixing formula and the corresponding formation of a reaction product.

Finally, it would also be possible to introduce an external lubricant from the outside into the recesses. Admission of this lubricant may be effected by separate bores that are arranged within the housing of the mixing chamber. In this case the lubricant may be selected so as to be particularly advantageous for the desired technical effect.

Further advantages and features of the present invention will be explained more in detail in the following with reference to the appended drawings in which are illustrated various embodiments.

Figure 1:
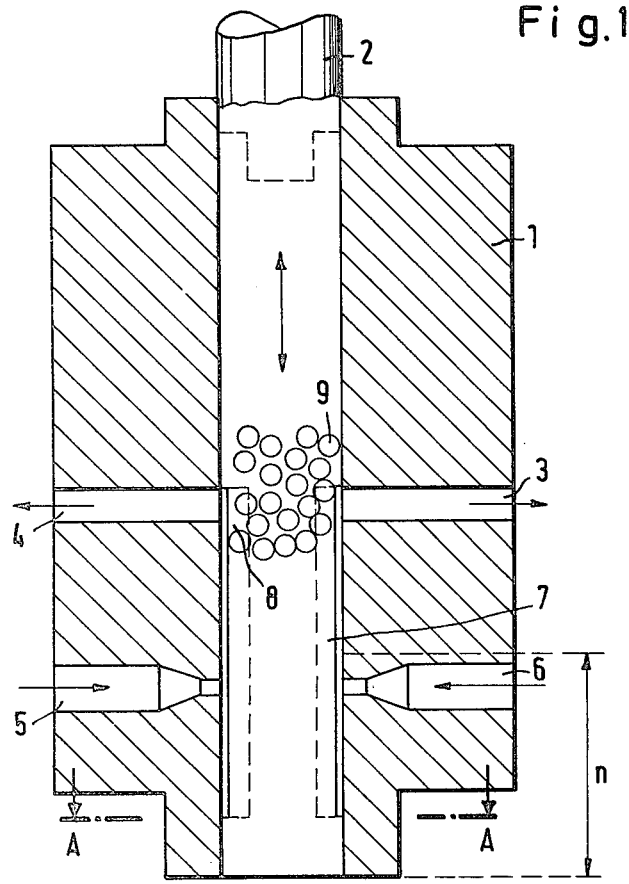
FIG. 1 is a schematical longitudinal sectional view of a mixing apparatus in accordance with the present invention, the control plunger being arranged in the closing and return position.
Figure 2:
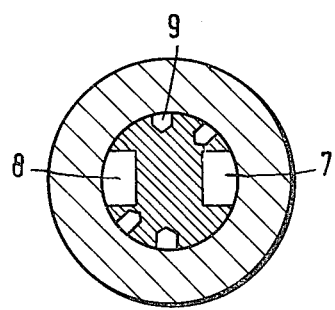
FIG. 2 is a cross-sectional view along the line A—A of FIG. 1.

The mixing apparatus shown in the drawings comprises a housing 1 in which is provided a cylindrical mixing chamber. Within this mixing chamber is disposed a control plunger 2 of a cross-section conforming to the cross-section of the mixing chamber.

Feed conduits 5 and 6 are connected to reservoirs (not shown) for the components via pumps (likewise not shown). Return conduits 3 and 4 in the housing are connected to such respective reservoirs.

In the control plunger 2 are defined return grooves 7 and 8 which in the closing position of the control plunger 2 (see FIG. 1) connect the feed conduits 5 and 6 to the associated return conduit 3 respectively 4.

The wall surface of the control plunger 2 is provided with blind bores 9 which define the above-described recesses. These blind bores 9 are arranged in the vicinity of the return grooves 7 and 8 and extend in longitudinal direction beyond this area.

Figure 3:
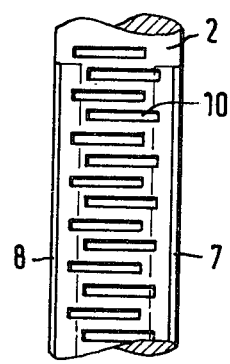
FIG. 3 is a fragmentary view of a control plunger having recesses of a different configuration.

In the embodiment according to FIG. 3, the recesses are defined by slots or pockets 10 which mutually overlap and are mutually offset in the direction of the return grooves.

Figure 4:
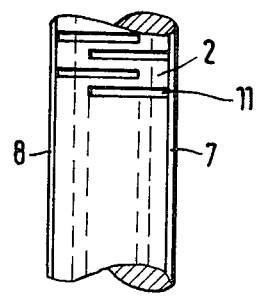
FIG. 4 is a view similar to FIG. 3 of another modified embodiment.

In the embodiment according to FIG. 4 the slots or pockets 11 are alternately connected to the return grooves.

Prior to the first intended usage of the apparatus the various recesses may also be filled with a specific suitable material that exhibits a corresponding lubricating effect. This material must not necessarily be a fluid material but may be of a consistency ranging from liquid to solid. Good sliding properties of the material disposed within the recesses are favorable in order to effectively prevent seizing.

In the normal operation of the mixing apparatus the control plunger 2 will be retracted for each mixing operation or "shot" into a position so far back that the feed conduits 5 and 6 will be in free communication with the then empty mixing chamber. The return conduits 3 and 4 will then be blocked by the front end of the control plunger 2. Upon termination of a shot, the control plunger 2 will be advanced into the position shown in FIG. 1, in thereby cleaning the mixing chamber and simultaneously ensuring that the components will flow back to their respective reservoirs through the return conduits in the housing, without mutually reacting.

What is claimed is:

1. A mixing apparatus for chemically reacting fluid components, preferably polyurethane-forming components, the apparatus having a housing including a mixing chamber with inlet ports for the individual components and an outlet port for a mixture of components and return conduits, a control plunger arranged within said mixing chamber, the cross-section of said control plunger conforming to the cross-section of said mixing chamber, said control plunger adapted to be reciprocated from a position in which said plunger clears said inlet ports into a position in the vicinity of said outlet port in which position said plunger blocks communication between said inlet ports and said mixing chamber, said control plunger having spaced return grooves extending along the outer periphery thereof for connecting said inlet ports to the return conduits in synchronism with the blocking of said inlet ports toward said mixing chamber, the control plunger having a wall surface portion disposed intermediate said return grooves said wall surface portion being provided with separate recesses with closed bottoms, said recesses being spaced from each other and each of said recesses having a width in a direction peripherally of the plunger, the widths of adjacent recesses lapping each other to receive leakage of the fluid components which upon reaction may bear against and slide along the inner periphery of the mixing chamber.

2. A mixing apparatus as defined in claim 1 wherein said recesses consist of slots extending perpendicularly of the direction of movement of said control plunger.

3. A mixing apparatus as defined in claim 2 wherein said recesses are alternately connected to opposing return grooves and mutually overlap in a central area of said control plunger.

4. A mixing apparatus as defined in claim 1 wherein said recesses consist of blind bores.

5. A mixing apparatus as defined in any of the preceding claims 1 to 4 wherein said recesses are arranged to extend beyond the wall surface area of the control plunger defined by said return grooves.

6. A dispensing and mixing apparatus including first and second chemically reacting fluid components being mixed to react and form a primarily solid reaction product, a steel housing defining a cylinder bore with an outlet port at one end and a mixing chamber adjacent the outlet port, and a pair of inlet ports communicating with the mixing chamber of the bore in spaced relation with the outlet port, the inlet ports respectively containing the first and second fluid components, the housing having a pair of return conduits communicating with the bore adjacent the inlet ports and also containing said fluid components, and a reciprocating steel control plunger in the bore and in close fitting relation therewith, the plunger traversing the inlet ports and return conduits and having a pair of spaced return grooves extending along the outer peripheries thereof and connecting inlet ports and return conduits with like fluid components therein, and the plunger also having a multiplicity of separate recesses between the said return grooves and spaced from each other, each of the recesses having a closed bottom and having a width in a direction peripherally of the plunger, the width of the adjacent recesses lapping each other, and the recesses containing the reaction product which bears against the bore wall of the housing in sliding relation to prevent the seizing between plunger and the housing.

7. The invention according to claim 6 and said recesses being clustered along the control plunger a distance from the end of the plunger approximately the same as the spacing between the return conduits and the outlet port.

8. The invention according to claim 6 and the recesses being disposed in both opposite sides of the control plunger between the return grooves.

* * * * *